United States Patent Office 3,255,131
Patented June 7, 1966

3,255,131
FLUOROCHEMICAL-CONTAINING VARNISHES
Arthur H. Ahlbrecht, Mahtomedi, and Norman J. Monson, St. Paul, Minn., assignors to Minnesota Mining and Manufacturing Company, St. Paul, Minn., a corporation of Delaware
No Drawing. Filed Apr. 10, 1962, Ser. No. 186,325
7 Claims. (Cl. 260—22)

This application is a continuation-in-part of copending application Serial No. 109,007, filed May 10, 1961, now abandoned.

This invention relates to new and useful fluorine-containing resins and their method of preparation. In one aspect this invention relates to modified resin compositions and their use in varnishes, lacquers, paints and various coating compositions.

Fluorocarbon compounds have been known to impart water and oil repellency to various materials and have been used to treat such materials as fabrics, leather, wood, kapok, paper, fur, asbestos, bricks, concrete, metals, ceramics, plastics, sponges and plaster. Highly fluorinated polymers containing a perfluorocarbon chain linked to the polymer chain through a sulfonamido group have been prepared by vinyl addition polymerization of vinyl esters and allyl esters of perfluoroalkanesulfonamidoalkylene-monocarboxylic acids, as described in U.S. Patent No. 2,841,573 and by vinyl addition polymerization of acrylate esters and methacrylate esters of perfluoroalkanesulfonamido alkanols, as described in U.S. Patent No. 2,803,-615. However, since such highly fluorinated polymers can only be dissolved in expensive fluorinated solvents at relatively low concentrations, their use in lacquers, varnishes and paints is precluded for all practical purposes.

It is, therefore, an object of this invention to provide a fluorinated resin composition which can be dissolved in conventional hydrocarbon solvents.

It is a further object of this invention to provide a clear or pigmented varnish or enamel which can be dried to an oil and water resistant coating.

Another object of this invention is to provide a means for the chemical incorporation of controlled amounts of saturated fluorocarbon compounds into various resin systems with or without the accompanying use of vinyl type addition reactions.

The above and other objects are accomplished by the incorporation into a solvent soluble resin having available hydroxyl, carboxyl, isocyanate or epoxy groups (e.g. a polyester, epoxy resin or polyurethane) of from about 1 to about 25 weight percent, based on total resin weight, of a fluorocarbon reactant having the formula $$R_f(X)_mZ$$

wherein $R_f$ is a perfluoroaliphatic (including perfluorocycloaliphatic as defined and used herein) radical having from 1 to about 18 carbon atoms, preferably 4 to 12 carbon atoms, X is

or

$m$ is 0 or 1, Z is a —$R^2CH_2OH$, or

wherein $R^2$ is an alkylene (i.e. —$C_nH_{2n}$—) or alkenylene (i.e. —$C_nH_{2n-2}$—) radical (including the substituted derivatives thereof) having from 1 to 18 carbon atoms, usually from 1 to 12 carbon atoms, and R' is hydrogen or an alkyl radical having from 1 to 12, preferably from 1 to 6, carbon atoms. Based on the incorporation of the perfluoroaliphatic radical into the resin system, the total elemental fluorine content introduced into the final resin is between about 0.5 and about 20 weight percent of the total resin solids. Significantly higher element fluorine content tends to adversely affect the air drying properties and the solubility of the modified resin products in the conventional hydrocarbon solvents, thereby decreasing their usefulness in varnishes, lacquers, paints and other solvent based coating compositions. However, it is also possible to dissolve some of the modified resin products in selected other solvents and also to disperse or, with the more water soluble products, to solubilize them in water.

These fluorocarbon reactants are chemically combined with and thus are incorporated into the above resins. This can be accomplished through the condensation of their hydroxyl or carboxyl groups with available carboxyl and hydroxyl groups in the resin system to form an ester linkage or bridging radical, or through the addition of their hydroxyl or carboxyl groups to an oxirane ring (the latter resulting in an ester linkage), or through the addition of their hydroxyl or carboxyl groups to an isocyanate group to form a urethane linkage and amide linkage respectively. The reaction of these fluorocarbon acids and alcohols in such resin systems is carried out in a manner similar to that conventionally employed with nonfluorinated carboxyl or hydroxyl containing components.

Monofunctional alcohols useful in this invention include the N-alkanol perfluoroalkane-sulfonamides described in U.S. 2,803,656, which have the general formula

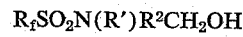

wherein $R_f$ is a perfluoroalkyl group (including perfluorocycloalkyl) having 4 to 12 carbon atoms, $R^2$ is an alkylene radical having 1 to 12 carbon atoms and R' is a hydrogen atom or an alkyl group containing 1 to 6 carbon atoms. These monofunctional alcohols are prepared by reactions of an acetate ester of halohydrin with a sodium or potassium salt of the corresponding perfluoroalkanesulfonamide. Illustrative alcohols include the following:

N-ethyl N-ethanol perfluorooctanesulfonamide,
N-hexyl N-ethanol perfluorooctanesulfonamide,
N-propyl N-ethanol perfluorooctanesulfonamide,
N-ethyl N-ethanol perfluoroethanesulfonamide,
N-ethyl N-ethanol perfluorododecanesulfonamide,
N-hexadecyl N-ethanol perfluorooctanesulfonamide,
N-ethyl N-ethanol perfluorocyclohexylethanesulfonamide,
N-propyl N-ethanol perfluorobutylcyclohexanesulfonamide,
N-ethyl N-ethanol perfluoro-4-dodecylcyclohexanesulfonamide,
N-ethyl N-ethanol perfluoro-2-methylcyclohexanesulfonamide,
N-ethyl N-hexanol perfluorooctanesulfonamide,
N-methyl N-undecanol perfluorooctanesulfonamide,
N-methyl N-butanol perfluorobutanesulfonamide,
N-ethanol perfluorooctanesulfonamide, etc.

Other useful monofunctional alcohols include the N-alkanol perfluoroalkanecarboxamides of the formula

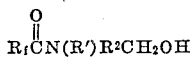

as described in U.S. Patent No. 2,764,602, e.g. N-ethanol perfluoroheptanecarboxamide, which may be prepared by reacting the alkanolamine with the corresponding perfluoroalkanecarboxylic acid ester, refluxing in solvent and recovering the product.

Still other useful alcohols include the perfluoroalkyl-substituted alkanols of the formula $C_nF_{2n+1}CH_2OH$, where $n$ is 3 to 12, (e.g. $C_3F_7CH_2OH$), described in U.S. Patent No. 2,666,797, and of the formula $$R_f—(CH_2)_m—OH$$

where $R_f$ is a perfluoroalkyl radical having from 3 to 12 carbon atoms and $m$ is an integer from 3 to 12 (e.g.

$$C_8F_{17}CH_2CH_2CH_2OH,\ C_3F_7CH_2CH_2CH_2OH$$

$C_8F_{17}CH_2CH_2CH_2CH_2CH_2OH$, etc.) described in U.S. Serial Number 677,229, filed August 9, 1957, now abandoned, which is incorporated herein by reference. The perfluoroalkyl-substituted alkenols may also be employed, i.e. $C_nF_{2n+1}(C_mH_{2m-2})OH$ where $n$ is 1 to 18 and $m$ is 1 to 18, preferably 1 to 12, e.g. $C_8F_{17}CH=CHCH_2OH$, which are described in U.S. Serial Number 677,229, filed August 9, 1957. Further useful monofunctional alcohols include the N-(polyoxa-alkyl)-perfluoroalkane sulfonamides of U.S. Patent Number 2,915,554, such as

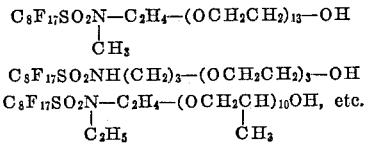

The carboxyl-containing fluorocarbon reactants include the monofunctional perfluoroalkanesulfonamidoalkylenecarboxylic acids of U.S. Patent No. 2,809,990, which have the general formula:

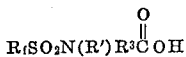

wherein $R_f$ is a perfluoroalkyl (including perfluorocycloalkyl) group having from 4 to 12 carbon atoms, $R'$ is hydrogen or an alkyl group having from 1 to 6 carbon atoms and $R^3$ is an alkylene group having from 1 to 18 carbon atoms. These acids may be obtained by preparing a perfluoroalkanesulfonamide, converting this to a sulfonamide salt, converting the latter to an ester of the desired acid and hydrolyzing the ester to form the acid. Illustrative acids include the following:

N-ethyl N-perfluorooctanesulfonyl glycine,
N-perfluorooctanesulfonyl glycine,
N-perfluoropentanesulfonyl glycine,
N-perfluorodecanesulfonyl glycine,
3-(perfluorooctaneulfonamido) propionic acid,
11-(N-methyl N-perfluorooctanesulfonamido) hendecanoic acid,
18-(N-methyl N-perfluorooctanesulfonamido)stearic acid,
11-(N-ethyl N-perfluorooctanesulfonamido) hendecanoic acid,
N-ethyl N-perfluorocyclohexylsulfonyl glycine
N-ethyl N-perfluorocyclohexylethanesulfonyl glycine,
N-butyl N-perfluoro-4-dodecylcyclohexanesulfonyl glycine,
N-ethyl N-perfluoro-2-methylcyclohexanesulfonyl glycine,
N-hexyl N-perfluorooctanesulfonyl glycine,
N-ethyl N-perfluorobutanesulfonyl glycine,
etc.

Other carboxyl containing fluorocarbon reactants include the monofunctional perfluoroalkanecarboxamidoalkylenecarboxylic acids, e.g.

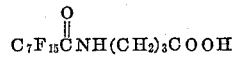

which may be prepared as follows: To a solution of 14.3 grams (0.11 mole) of ethyl γ-aminobutyrate in 100 cc. of ether is added 43.2 grams (0.1 mole) of $C_7F_{15}COOC_2H_5$. Vent is removed under reduced pressure. The resulting ethyl ester is hydrolyzed by warming in dilute sodium hydroxide solution, and the acid product is precipitated by acidification with dilute hydrochloric acid.

Still other carboxyl containing fluorocarbon reactants include the perfluoro-substituted aliphatic acids, described in U.S. Patent No. 2,951,051, such as $$C_8F_{17}CH_2CH_2CH_2CH_2COOH$$

5-perfluorobutyl pentanoic acid, 11-perfluorooctyl-hendecanoic acid, etc. as well as the unsaturated perfluoroalkane aliphatic acids, e.g. $R_fCH=CH—(CH_2)_7CH_2CO_2H$, also described in U.S. Patent No. 2,951,051.

These fluorocarbon reactants may be introduced during the resin preparation or may be reacted with available oxirane rings or with free hydroxyl, carboxyl or isocyanate sites on the partially or fully polymerized resin. When the proportions of the respective reactants are selected to provide an excess of available hydroxyl groups, the above fluorocarbon reactants having carboxyl substituted groups are preferably employed. However, the hydroxyl containing fluorocarbon alcohols may be utilized in such circumstances if they are reacted with dicarboxylic acids in such ratio as to form the corresponding half-ester, then the resulting half-ester is condensed with the available hydroxyl groups in the system. The former procedure is preferred, since it results in a minimum of ester linkages which may tend to hydrolyze upon extended exposure to moisture. When an excess of isocyanate or carboxyl groups exists in the system, the hydroxyl containing or alcoholic fluorocarbon reactants of the abovementioned type are preferably employed, although the carboxyl containing fluorocarbons may be used if the half-ester with a polyhydroxy compound, e.g. trimethylol propane, ethylene glycol, etc. is first formed.

In general, the resins which are modified in accordance with this invention must be solvent soluble, i.e. they must be soluble in either xylene or methylethyl ketone at 70° F. to the extent of 25 weight percent or more when in unmodified form. It is therefore preferred to maintain the overall average molecular weight of the unmodified resins below a maximum of about 5,000, usually below 3,500. These resins are prepared from a reactive system which contain compounds capable of either condensation polymerization or non-vinyl addition polymerization inter se and which further contain available groups reactive with active hydrogen in excess of that required for said condensation or non-vinyl addition polymerization.

Polyester resins having available hydroxyl or carboxyl groups may also be modified with the fluorocarbon reactants of this invention. Polyester resins, as used herein, include the alkyd resins, and the reactants may be either saturated or unsaturated. Since linear polyesters are produced by reacting a dibasic acid and a glycol, the sole reactive sites for chemical incorporation of the fluorocarbon reactants are at the ends of the linear chain. In such cases, the mono-functional fluorocarbon reactants serve as chain terminating agents when included in the reactant mixture, thereby limiting the molecular weight of the resinous product. If the fluorocarbon reactant is added after or during the later stages of the polymerization, the higher molecular weights can be realized, though the maximum percent of fluorine in the modified resin is accordingly reduced. It is most preferable to include a polyfunctional acid or alcohol having at least three acidic or alcoholic groups, e.g. glycerol, pentaerythritol, trimesic acid, tricarballylic acid, etc. among the reactants to provide reactive sites along the linear chain, both for purposes of crosslinking and for esterification with the fluorocarbon acids or alcohols. Phthalic anhydride, for example, may be used with the higher functional alcohols such as glycerol to produce resins having crosslinked structure. By using a mixture of alcohols or acids, the resin properties may be usefully modified. For example, if some acid (or anhydride) such as phthalic anhydride is replaced with a relatively long chain fatty acid, such as lauric or linoleic acid, the distance between reactive or cross-linkable sites to greater and a softer resin results. If the more highly soluble glycols are used, the resin may have varying degrees of water solubility or dispersibility.

The alkyd resins are polyesters which are frequently oil modified with drying, semi-drying and non-drying oils to improve flexibility. Air drying alkyds include such good drying oils as linseed and dehydrated castor oil, and semi-drying soybean oil is useful in medium and short oil alkyds. Moreover, polyesters containing unsaturated acids, such as maleic or fumaric, may be modified by reacting unsaturates such as styrene, methyl methacrylate, fluorinated acrylate and methacrylates (e.g. those set forth in U.S. Patent No. 2,803,615), fluorinated vinyl esters (e.g. those described in U.S. Patent No. 2,841,573), with the polyester unsaturation to increase the hardness of the resin. The method for the preparation of such polyesters in both modified and unmodified form is well known and need not be further elaborated here. Examples 3, 4, 9 and 10 herein illustrate polyesters modified with the fluorocarbon reactants in accordance with this invention.

The epoxy resins, as typified by the diglycidyl ether of bisphenol A and higher homologues thereof, have a chain structure which contains ether oxygen, reactive hydroxy groups and may also contain epoxy groups. Such resins are frequently modified with anhydrides or acids, particularly vegetable and monobasic fatty acids, by reaction with the hydroxyl groups or the epoxy groups, to provide epoxy ester resins suitable for a particular use, e.g. in air drying coatings. By employing above described fluorocarbon acids or a 1:1 adduct of the above described fluorocarbon alcohols with a dibasic acid (e.g. phthalic anhydride) fluorinated epoxy esters may be prepared which have good oil and water resistance without sacrificing desirable film properties. Also, the reaction of the fluorocarbon alcohols directly with the epoxy groups proceeds rapidly in the presence of catalysts, as with the similar reaction using ordinary unfluorinated alcohols. In one preferred illustrative embodiment a liquid epoxy resin (the diglycidyl ether of bisphenol A, epoxy equivalent 170–190) may be reacted under basic conditions with stoichiometric amounts of bisphenol A or a saturated or unsaturated dicarboxylic acid (e.g. diphenic, adipic, maleic or phthalic), a small quantity of vegetable acid to control molecular size and the desired amount of fluorocarbon acid, then the residual hydroxyl groups may be esterified with further vegetable acids (e.g. linseed oil acid) until a low acid number is attained. Solid epoxy resins which may be modified with the fluorocarbon acids or alcohol adducts may range from about 500 to about 5000 in molecular weight and have epoxide equivalents from about 350–2500. When the esterified epoxy resin contains less than about 25 percent combined weight of the fluorocarbon reactants of this invention and further is partially esterified with unsaturated acid, the modified resin has air drying properties similar to the air drying alkyds. Larger amounts of the fluorocarbon reactants tend to decrease air drying properties and adversely affect solubility of the resins in the conventional hydrocarbon solvents.

Polyurethane resins may also be modified with the abovementioned fluorocarbon reactants. These resins are formed as reaction products of a diisocyanate, such as toluene diisocyanate, with an organic compound having at least two active hydrogen atoms per molecule, "active hydrogen" being defined by Zerewitinoff in Ber. 40, 2025 (1906), JACS 49, 2818 (1927) and referring usually to the hydrogen of —OH, —COOH, and —$NH_2$ groups. Both linear and crosslinked polyurethanes may be prepared, the latter being provided by incorporation of a trifunctional reactant, such as a polyether triol (e.g. the condensation product of propylene oxide and 1,2,6-hexanetriol), into the resin system. The reactants may be varied to alter the resin properties, and the fluorocarbon reactant is incorporated into the system accordingly. Thus, in the presence of an excess of the isocyanate radical the monofunctional fluorocarbon reactants of this invention, which contain active hydrogen, add to the available isocyanate groups in the system. The fluorocarbon alcohols react to form a urethane linkage, and the fluorocarbon acids react to form an amide linkage with the liberation of carbon dioxide. These fluorocarbon reactants may be first reacted with diisocyanate to form the 1:1 adduct, which can then in turn be reacted with available hydroxyl groups in the resin system, as an alternative means for incorporation. If the fluorocarbon acid derivative is used in excess of the amount required for the additional reaction, a direct esterification with available hydroxyl groups (for example, as found on a polyether triol) can also be effected, although the presence of ester linkages is not generally preferred because of their tendency to hydrolyze. Hydroxyl-containing oils such as castor oil (pigmented or clear) may be included in the resinous system to add, through their hydroxyl groups, to available isocyanate groups or, if desired, such oils may be added to the moisture free system before use to lengthen shelf life. These systems may be air cured at room temperature or may be more rapidly cured at elevated temperatures in the presence of moisture.

The following examples will serve to illustrate the invention but, particularly in view of the many obvious modifications thereof, are not intended to be limiting.

EXAMPLE 1

This example illustrates the fluorocarbon modified alkyd resins of an oxidizing type an a technique for their preparation. The stepwise procedure is essentially a typical alkyd cook, using the azeotropic distillation of the water in the well-known solvent process.

A 2-liter Pyrex glass flask equipped with thermometer, stirrer and reflux-distilling head was charged with 226 grams of phthalic anhydride, 95 grams of N-ethyl perfluoroocetanesulfonamido ethanol, 238 grams of dehydrated castor oil acids and 35 grams of xylene. The mixture was heated with stirring to 160° C. and held at this temperature for one hour to insure essentially complete reaction of the fluorocarbon alcohol. Then 129 grams of glycerol (a 10% excess) was added and the temperature increased to 190° C. The xylene and water of esterification refluxed and collected, and the temperature rose to 210° C. The total processing required 5½ hours to attain an acid number of 10 based on resin solids. After thinning the resinous product with xylene to 50% solids, metallic driers (cobalt and lead naphthenate) were added in concentration of 0.03% cobalt metal and 0.40% lead metal based on the weight of oil solids to aid in oxidation of the oil constituent. About 10% by weight of solids of butylated melamine-formaldehyde resin may be added to increase surface hardness, mar resistance and flow properties. The resultant varnish could be applied to a glass or metal surface by spraying or dip coating or by a draw down bar and curing thereon by heating in air at 300° F. for 15–45 minutes. The varnish was readily pigmentable. Fluorinated alcohol in this resin constituted 15% of resin solids and the $C_{18}$ oxidizing oil acid constituted 40% by weight of resin solids.

In a different embodiment, using the same procedures employed above, 12% of 1,1,9-trihydrohexadecafluoro-1- nonanol, based on total resin weight, are incorporated into the above alkyd. The respective amounts of the ingredients include: 226 grams phthalic anhydride, 74 grams 1,1,9-trihydrohexadecafluoro-1-nonanol, 238 grams dehydrated castor oil acids, 129 grams glycerol and 35 grams xylene.

Other modified alkyd resins were prepared with variations in oil length as well as type and amount of fluorocarbon reactant. As with ordinary alkyd resins the amount and type of solvent used to thin the resin is dependent on the amount of oil acid contained in the resin. For example, aliphatic solvent such as mineral spirits and heptane are used in higher amounts of oil, and aromatic solvents such as xylene and toluene are used with lower oil content.

EXAMPLE 2

This example describes the preparation of a fluorocarbon modified alkyd resin containing coconut oil acids (40% by weight of resin solids), a non-oxidizing type because of the low degree of unsaturation of coconut oil acids. Such alkyds are usually formulated to react to a relatively high acid number (50 to 100) and are then further crosslinked with a reactive resin, e.g. butylated melamine-formaldehyde, with heat curing. Non-oxidizing alkyds are noted for their lack of discoloration on aging and high gloss retention and are extremely useful in white baking enamels. The fluorocarbon modified non-oxidizing alkyds may be prepared by the procedure of Example 1, in which the fluorocarbon alcohol is reacted with phthalic anhydride before addition of the glycerol. However, the following alternative procedure involves preparation of the alkyd resin (acid number of about 100 or higher) and subsequent refluxing with the fluorocarbon alcohol until the decreased acid number indicates essentially complete esterification of the fluorocarbon reactant.

A 1-liter Pyrex glass flask was charged with 250 grams of an alkyd resin (non-oxidizing oil, acid number 120, 80% solids in cellosolve acetate) and 66 grams of N-ethyl perfluorooctanesulfonamido ethanol. The clear solution was refluxed for 2½ hours at 200° C. until the acid number was 48. Forty grams of xylene and 164 grams of a 55% solids solution of butylated melamine-formaldehyde resin were added. The final solids content was 70%. Hard, smooth films prepared by curing for 45 minutes at 300° F. displayed good oil and chemical resistance.

In the above alkyd examples various polyols may be substituted for glycerol, including pentaerythritol, trihydric, tetrahydric or other polyhydric alcohols. The corresponding fluorocarbon acids may be substituted for the fluorocarbon alcohols if the alkyd resin has available esterifiable hydroxyl groups.

EXAMPLE 3

A reactive polyester system was modified with the fluorocarbon reactants of this invention as follows:

A 1-liter Pyrex glass flask equipped with stirrer, thermometer and reflux distillation head was charged with 222 grams of phthalic anhydride, 147 grams of maleic anhydride, 114 grams of propylene glycol, 65 grams of N-propyl perfluorooctanesulfonamido ethanol, and 10 grams of toluene. After heating to 205° C. and refluxing for 2½ hours, twenty grams of water collected. The reaction mass was then cooled to 170° C. and an additional 114 grams of propylene glycol was introduced into the system. The temperature was increased to 210° C. and refluxing continued for 2½ hours until the acid number was 37. When the polyester had cooled to room temperature, sufficient inhibitor free styrene was added to provide a 1:1 ratio by weight of polyester/styrene. Approximately, one gram of benzoyl peroxide was dissolved in 99 grams of the reactive system, and films were prepared with a draw down bar. After curing for one-half hour at 140° C. the film displayed excellent resistance to both water and oil. The fluorocarbon reactant constituted 5 weight percent of the polyesterstyrene system.

The reactive polyester (60 grams) was also dissolved in 40 grams of methyl methacrylate and similarly copolymerized in the presence of a free radical catalyst or initiator (1% benzoyl peroxide). The resultant cured films were similar in water and oil resistant properties to the above polyester-styrene copolymer films.

In both of the above cases, the presence of the fluorochemical enhanced the reaction of the styrene and methacrylate with the polyester by excluding air and reducing the evaporation rate of the styrene and methacrylate monomers from the flowed out film.

EXAMPLE 4

The fluorocarbon modified alkyd of Example 1 can be styrenated to improve such properties as surface hardness of film and air curing rate.

A 1-liter Pyrex glass flask equipped with dropping funnel, thermometer, stirrer and reflex condenser was charged with 320 grams of a 75% solution of the Example 1 alkyd resin (40% oil, 15% fluorocarbon) in xylene. After warming to 90° C., 104 grams of styrene and 2 grams of benzoyl peroxide was added slowly over a 15-minute period. The temperature was then raised to 140° C. and held for one hour. Cobalt naphthenate (0.03% cobalt based on oil weight) was added during the down heat. The final product had a clear, light brown appearance and displayed excellent shelf life. Oil and water resistant properties were excellent.

Sixty grams of the alkyd resin was dissolved in and copolymerized with methyl methacrylate with similar results.

EXAMPLE 5

This example illustrates a typical epoxy polyester prepared from an epoxy resin having an equivalent weight of about 150, i.e. 280 grams of $C_{18}$ fatty acid (1.0 equivalent) is required to esterify 150 grams of epoxy resin. The fluorocarbon reactant, N-ethyl perfluorooctanesulfonyl glycine, provided a 5% fluorocarbon content based on the total resin solids. The drying oil constituent, dehydrated castor acids, constituted 43% of the resin solids.

A 1-liter Pyrex glass flask equipped with stirrer, thermometer and inert gas sparge was charged with 150 grams of Ep 201 (3,4-epoxy - 6 - methylcyclohexylmethyl-3,4-epoxy-6-methyl cyclohexane carboxylate; 150 equivalent weight; a product of Union Carbide Chemical Co.), 128 grams of dehydrated castor acid and 15 grams of N-ethyl perfluorooctanesulfonyl glycine. The mixture was heated to 180° C. with stirring and the reaction was followed by acid number determinations. After one hour the acid number was 10. The product was allowed to cool to room temperature, and 33 grams of xylene was added to make 90% solids. A catalyst solution of $BF_3$-etherate in xylene (4.5 grams $BF_3$ in 213 grams xylene) was added slowly over a one-half hour period. The solids concentration was 55% at this point. A cool water bath was required to maintain a temperature range of between 25–30° C. over a 1 hour period with stirring. The addition of $BF_3$ effects the polymerization of residual unreacted epoxy and hydroxyl groups. Water (1% based on solids) was then added to hydrolyze the boron-polymer complexes which are also formed during the polymerization. Additional xylene was added to reduce the solids content to 50%. The somewhat muddy product was treated with sodium carbonate (2% of solids) to improve the color and was then filtered. Cobalt naphthenate (0.03% cobalt metal based on weight of oil) was introduced, and films were prepared on glass and metal with a draw down bar. The resulting films heat and air cured to hard water and oil resistant films. Ten percent of a melamine-formaldehyde resin may be added to improve the surface hardness of the cured film.

EXAMPLE 6

Using the same procedure and apparatus as in Example 5 the following reactants were employed: 245 grams of epoxy resin (e.g. wt. 150), 180 grams of soya bean oil acids and 75 grams of N-ethyl perfluorooctanesulfonyl glycine. The final product contained 15% of the fluorocarbon reactant based on total solids, and was somewhat dark in appearance.

EXAMPLE 7

The dark color of the product in Example 6 was attributed to the fluorocarbon glycine acid. This example illustrates the use of a fluorocarbon alcohol to achieve improved product properties.

A 1-liter Pyrex glass flask equipped with stirrer, a reflux condenser and thermomometer was charged with 50 grams of succinic anhydride, 288 grams of N-ethyl perfluorooctanesulfonamido ethanol and 144 grams of toluene. The solution, having an initial acid number of 130, was refluxed at 115° C. for 3½ hours, and the toluene was then removed by vacuum distillation. The product, mostly the half ester of succinic acid, had an acid number of 90. Heating was continued with stirring for another 1½ hours with virtually no solvent until the final acid number was 78. The product was a white, hard waxy solid with an equivalent weight of 715 based on acid number.

Using the apparatus and procedure of Example 5 215 grams of epoxy resin (e.g. eq. wt. 150), 146 grams of soya bean oil acid, and 83 grams of the above half-ester succinic derivative were charged and reacted. The final product (55% solids in xylene) had a lighter color, was faster drying and produced harder films than the product of the preceding example. The fluorocarbon reactant constituted 15% of the final solids.

EXAMPLE 8

This example illustrates the modified polyurethane resins of this invention.

A dry 1-liter glass flask equipped with reflex condenser, stirrer, dry nitrogen gas inlet and thermometer was charged with 32.4 grams of N-ethyl perfluorooctanesulfonamido ethanol and 70.4 grams of Niax Triol LK 380, a trihydroxyl polyether (M.W. 440) prepared by reacting propylene oxide and 1,2,6-hexane triol (a product of Union Carbide Chemical Co.). The fluorinated alcohol dissolved in the trihydroxy polyether at 40° C. With the temperature held at 60° C., 76.2 grams of toluene diisocyanate was introduced slowly over ½ hour into the mixture through a dropping funnel equipped with a drying tube. The temperature of the reaction mixture was increased to 80° C. with a hot water bath. To decrease the viscosity of 66 grams of water-free ethyl acetate (urethane grade) was added to the flask. After maintaining the temperature, first at 80° C. for 3 hours then at 90° C. for 1½ hours, the product was thinned to 70% solids in ethyl acetate and discharged into a tin can covered with a layer of dry nitrogen gas. The combined fluorocarbon alcohol constituted 16% by weight of solids and the ratio of isocyanate to hydroxy groups was 2.0.

Castor oil (79 grams) was mixed into this product (358 grams) to yield a final product with 50% solids and with a ratio of isocyanate to hydroxyl of 1.5. This product can be further cured at room temperature with atmospheric moisture at 175° C. for 30 minutes. This product contained 12% by weight of the fluorocarbon alcohol.

If a pigmented enamel is desired, the castor oil may be pigmented with a conventional enamel type pigment and thinned with water-free toluene or xylene to obtain the appropriate viscosity. The final product had good shelf life and provided a film with good oil and water repellency; particularly if the ratio of isocyanate to hydroxyl groups was in the 1.0–1.9 range. The fluorocarbon alcohol content was from about 5 to 25 percent by weight of total resin solids.

EXAMPLE 9

To a 1-liter, three-neck flask, equipped with stirrer, thermometer, nitrogen gas inlet, reflux condenser and dropping funnel was charged 250 grams of the fluorinated alkyd of Example 1 in 50% solids solution in xylene, and 5 grams of a 73% solution of cumene hydroperoxide. The alkyd/peroxide solution was heated gradually to 80° C. with stirring and with a slow flow of nitrogen. 166 grams of a 50% solution (in methyl isobutyl ketone) of N-ethyl perfluorooctanesulfonamidoethyl methacrylate was slowly added at a rate of 2–3 milliliters per minute, and the solution temperature was slowly increased to reflux (130° C.) during the one hour addition period. After the addition was complete, the reflux temperature was maintained until the viscosity increase stopped (about 6–7 hours). The light-colored resin was allowed to cool, then was placed in storage. Cobalt naphthenate (6% solution) at 0.03% cobalt ion concentration was added during the down heat. The final overall fluorocarbon content was about 55% (including 15% fluorinated alcohol reactant in fluorinated alkyd of Ex. 1). Films cured at 350° F. for 45 minutes were hard, had excellent mar resistance and were exceptionally smooth.

EXAMPLE 10

Twenty grams of N-ethyl perfluorooctanesulfonamidoethyl methacrylate was dissolved in 120 grams of a 50% solution (xylene) of a fluorinated polyester (15% fluorocarbon alcohol), prepared from a 1:1 mol ratio of maleic and phthalic anhydride esterified to an acid number of 35 with propylene glycol and N-ethyl perfluorooctanesulfonamido ethanol. Benzoyl peroxide (16 grams) was dissolved in the solution. The overall combined fluorocarbon reactants was 35%. Films were cast on glass and cured at 350° F. for one hour. The films were continuous, glossy and not quite as hard as those set forth in Example 9.

Films produced from the fluorocarbon modified resins of this invention have been evaluated in terms of film hardness, air curing rate, chemical and solvent resistance, oil and water repellency, shelf life, weathering qualities, and adhesion to various substrates. Tables I and II show some of these properties in comparison to the original unmodified resins. Coatings produced with the fluorocarbon modified resins are considered to have a satisfactory balance of properties if they have a Sward hardness of 15, pass a flexibility test on tin panels when wrapped around one-eighth inch mandrels, have good adhesion to glass and metal (i.e. no lifting of film when scratched), display good mar resistance to scratching, exhibit good solvent resistance to aromatic and aliphatic solvents, show good chemical resistance (e.g. 5% solutions of sodium hydroxide, hydrochloric acid, detergents) and have excellent general film appearance. Weatherability was obtained on various fluorocarbon modified resins, the data on film deterioration (e.g. loss of gloss, checking, cracking, peeling, discoloration, etc.) being obtained after 1000 hours exposure in the weatherometer and 3½ months outdoor exposure. The water and oil resistance of the films was obtained by measurement of contact angles with both polar and non-polar solvents.

Results of the tests indicated that from about 1 to 25 weight percent based on total resin solids, preferably from 7% to 15% of the fluorocarbon acids and alcohols herein described produces modified resins which satisfactorily meet the above standards. Such fluorocarbon modified resins have superior oil, water and solvent resistance as compared to the unmodified resins. They can readily be used in conventional lacquer, enamel and varnish formulations. Weathering data on films produced therefrom has shown that the fluorocarbon content imparts no deleterious effects on film durability and in fact improves gloss retention and improves overall appearances. When the resin is cured through oxidation of an unsaturated oil, curing in air at 75° F. was somewhat slower with the fluorocarbon modified resin, but vinyl addition type modification (e.g. styrenation, methacrylation, etc.) increased air curability considerably. Moreover, by conducting such modification with a fluorinated vinyl ester, acrylate or methacrylate, the total fluorocarbon content in the final resins system can be raised to about 50 weight percent, if desired. The fluorocarbon modified polyesters, epoxys and polyurethanes of this invention are particularly useful in varnish and enamel formulations designed for use where oil borne dirt and water resistance is required, e.g. in auto finishes and refinishes, appliances, and as a general industrial paint.

EXAMPLE 11

An air drying alkyd resin incorporating

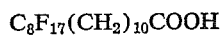
$C_8F_{17}(CH_2)_{10}COOH$ as the fluorocarbon moiety was prepared in the following manner. Using a 3-liter reaction flask equipped with mechanical stirrer, nitrogen inlet, thermometer and a Vigreux column with xylene/water azeotrope condenser and trap, about 384 grams of phthalic anhydride, 230 grams (including 10% excess) of glycerol, 98 grams of $C_8F_{17}(CH_2)_{10}COOH$, 200 grams of linseed fatty acids and 70 grams of xylene were charged to the reaction vessel. The mixture was heated to reflux with good agitation under a blanket of nitrogen. Reflux started at 150° C., and water started to collect at about 170° C. Refluxing was continued for about 1½ hours, after which an additional 180 grams of linseed fatty acids was slowly added. The temperature was gradually increased to 220° C. and maintained until an acid value of 15 was reached. The clear resin was thinned to 60% solids in xylol (60 grams) after the temperature had dropped to 145° C. the resin had a Gardner viscosity of about L and a clear color of about 12. A film containing the usual driers was allowed to dry overnight and was dried throughout in 2 days. The clear film had an oil contact angle of 60°.

Similar results can be achieved by replacing the saturated fluorochemical acid with

$$C_7F_{15}\overset{O}{\underset{\|}{C}}-NH(CH_2)_3COOH$$

EXAMPLE 12

About 144 grams of phthalic anhydride, 42 grams of glycerol, 86 grams of linseed fatty acids (alkali refined), 35 grams of

$$C_7F_{15}\overset{O}{\underset{\|}{C}}NHCH_2CH_2OH$$

and 20 grams of xylene were charged to a 1-liter 3-necked reaction flask equipped as described in Example 11. The mixture was heated to reflux (about 140° C.) and maintained for about one hour, when an added 42 grams of glycerol was added and the temperature increased to about 170° C. During the ensuing three hours of reaction, an additional 86 grams of linseed acids was added. The maximum temperature attained was 215° C. The final acid value on solids was 25. The clear, light brown resin had a Gardner viscosity of X as a 75% solids solution in xylene and a color of 12. A film of the 75% solution containing conventional driers was drawn down on glass and cured one hour at 250° F., after which the film was dry but slightly tacky. The film was then cured for an additional hour at 300° F. to yield a dry, rubbery film with a hexadecane contact angle of 50° C.

EXAMPLE 13

A reaction flask equipped as in the preceding examples was charged with 35 grams of phthalic anhydride, 23 grams of glycerol, 41 grams of dehydrated castor acids and 6 grams of $C_8F_{17}CH=CHCH_2OH$. The mixture was refluxed for 3½ hours until an acid value of 4.3 was reached. The Gardner viscosity of the 50% solids solution in xylene was E–F. A 3-mil film containing conventional driers was drawn down on glass and cured in air for 30 minutes with subsequent baking at 300° F. for one hour. A hard clear film was produced, which gave a hexadecane droplet contact angle of 50°.

EXAMPLE 14

This example describes the chemical incorporation of $C_8F_{17}SO_2N(C_2H_5)CH_2CH_2OH$ in an alkyd resin that may be dispersed in water to form an aqueous system or may also be dissolved in organic solvents rather than water dispersions, if desired.

A 1-liter reaction flask fitted with a mechanical stirrer, inert gas inlet tube, thermometer and a water/xylene azeotrope head with condenser was charged with 535 grams of refined linseed acids, 185 grams of pentaerythritol, 237 grams of phthalic anhydride, 112 grams of polyethylene glycol (average molecular weight of 1540) and 70 grams of xylene. The heating was effected with a heating mantle and powerstat. The mixture was heated under a blanket of nitrogen to 153° C., at which temperature refluxing started. Water of esterification also started to collect in the azeotrope separator at this point. The temperature was gradually increased over a four-hour period to a peak temperature of 243° C., collecting about 62 cc. of water of esterification which was continually drawn off during the reaction. At this point, the acid value on a solids basis had fallen to 25. The solids content was about 95% in xylene. About one-half (500 g.) of the alkyd solids was charged to another reaction flask of similar type. About 86 g. of

$$C_8F_{17}SO_2N(C_2H_5)CH_2CH_2OH$$

and 30 g. of xylene were charged to the flask containing the prepared alkyd. The mixture was warmed to about 100° C. to effect good mixing; the acid value on solids at this point was 21. The solution was increased in temperature to 220° C. where refluxing started. The temperature rose to 260° C. after 2 hours (peak). The temperature was decreased to 250° C. and held there for an additional hour. At this point the acid value of the clear resin solids was 12.

When the temperature had fallen to about 90–100° C., the alkyd was poured slowly into rapidly agitated hot (about 70° C.) distilled water to form a thick, milky dispersion of excellent stability. The solids content in water was 50±1% with a Brookfield viscosity of 6000 cps. The alkyd may be cured as films with cobalt or manganese naphthenate (0.03% metal based on oil solids). Air dry film will dry in one day and through dry in several. The alkyd resin may be blended with other types of latices and water systems. Films of the alkyd itself or in blends with other resins display oil contact angles on cured film of 70° C. or higher.

Other modifications and embodiments will be apparent from the above disclosure without departing from the scope of this invention.

TABLE I.—DESCRIPTION OF RESINS AND PHYSICAL PROPERTIES OF FILMS

| Resin | Percent Fluorine [1] | Air Drying Ability | 300° F., 45 min. | Contact Oil [2] | Angle Water | Application | Properties |
|---|---|---|---|---|---|---|---|
| Phthalic Alkyd (oxidizing) | 4 | Fair | Excellent sl. yellow. | 55° | 90° | Spray, dip | Satisfactory balance. |
| Do | 8 | do | do | 65° | 90° | do | Do. |
| Phthalic Alkyd (semi-oxidizing) | 13 | Good | Excellent, no yellow. | 70° | 90° | do | Satisfactory balance (excellent solvent resistance). |
| Phthalic Alkyd (non-oxidizing) | 10 | | do | 68° | 90° | do | Do. |
| Epoxy Polyester (oxidizing) | 8 | Fair | Excellent sl. yellow. | 65° | 90° | do | Satisfactory balance. |
| Phthalic Alkyd control (oxidizing) | None | Good | do | None | 60° | do | Satisfactory balance (fair solvent resistance). |
| Polyurethane | 6 | Excellent | Excellent (200° F.), no yellow. | 45° | 95° | do | Satisfactory balance (excellent solvent resistance). |
| Do | None | do | Excellent (200° F.). | None | 60° | do | Satisfactory balance. |
| Alkyd, styrenated | 4 | Very good | Excellent sl. yellow. | 50° | 90° | do | Do. |
| Polyester—styrene 1% MEK [3] peroxide. | 4 | Fair | Good | 50° | 90° | Spray, curtain coat. | Do. |

[1] Percent fluorine (elemental) is approximately one-half of the weight of the fluorocarbon derivative.
[2] Hexadecane.
[3] MEK-methyl ethyl ketone.

Table II.—WEATHERABILITY (WEATHEROMETER AND OUTDOOR) [1]

| Resin | Percent Fluorine | Exposure | Checking/Peeling | Fading | Gloss | General Appearance |
|---|---|---|---|---|---|---|
| Alkdyd (oxidizing) | 4 | None | 5 | 5 | 5 | 5 |
| Do | 4 | Weatherometer | 5 | 4 | 3 | 4 |
| Do | 4 | Outdoor | 5 | 4 | 3 | 3 |
| Do | None | None | 5 | 5 | 5 | 5 |
| Do | None | Weatherometer | 5 | 4 | 3 | 3 |
| Do | None | Outdoors | 5 | 4 | 2 | 3 |

[1] Weatherometer 1,000 hours, outdoor St. Paul, Minn. 45° to the south: 5—excellent. 4—good. 3—fair. 2—poor.

Above panels were pigmented with titanium dioxide, phthalocyanine blue or toluidine red in percentages of 20% PVC (pigment volume concentration).

We claim:

1. A fluorine containing resin which comprises a condensation polyester resin, epoxy resin or urethane resin having available hyroxyl, carboxyl, isocyanate or epoxy groups and having bonded thereto through said available groups from about 1 to about 25 weight percent, based on total resin weight, of a fluorochemical substituent having the formula $$R_f(X)_mZ$$

wherein $R_f$ is a perfluoroaliphatic radical having from 1 to about 18 carbon atoms, X is selected from the group consisting of

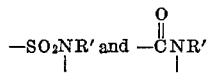

$$-SO_2NR' \text{ and } -\overset{O}{\underset{|}{C}}NR'$$

m is selected from the group consisting of 0 to 1, R' is selected from the group consisting of hydrogen and an alkyl radical having from 1 to 12 carbon atoms, and Z is selected from the group consisting of $R^2CH_2OH$ and $R^2COOH$, where $R^2$ is selected from the group consisting of alkylene and alkenylene radicals having from 1 to 18 carbon atoms, said bonding being effected through a bridging radical selected from the group consisting of

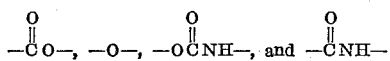

$$-\overset{O}{\underset{}{C}}O-, \quad -O-, \quad -O\overset{O}{\underset{}{C}}NH-, \text{ and } -\overset{O}{\underset{}{C}}NH-$$

the elemental fluorine content of said resin attributed to the $R_f$ radical being from 0.5 to about 20 weight percent of total resin.

2. The fluorine-containing resin of claim 1 in which said resin having available hydroxyl, carboxyl, isocyanate or epoxy groups is a condensation polyester resin.

3. The fluorine-containing resin of claim 1 in which said resin having available hydroxyl, carboxyl, isocyanate or epoxy groups is an epoxy resin.

4. The fluorine-containing resin of claim 1 in which said resin having available hyroxyl, carboxyl, isocyanate or epoxy groups is a urethane resin.

5. A process comprising the polymerization of reactive compounds having available hydroxyl, carboxyl, isocyanate or epoxy groups reactive with active hydrogen in excess of the amount required for said polymerization to produce a solvent soluble resin, said reactive compounds being selected to provide a condensation polyester, an epoxy resin or a urethane resin, and the reaction therewith at a temperature above about 130° C. of a fluorochemical compound of the formula $$R_f(X)_mZ$$

wherein $R_f$ is a perfluoroaliphatic radical having from 1 to about 18 carbon atoms, X is selected from the group consisting of

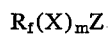
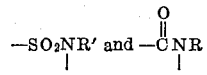

$$-SO_2NR' \text{ and } -\overset{O}{\underset{|}{C}}NR$$

m is selected from the group consisting of 0 and 1, R' is selected from the group consisting of hydrogen and an alkyl radical having from 1 to 12 carbon atoms, and Z is selected from the group consisting of $R^2CH_2OH$ and $R^2COOH$, where $R^2$ is selected from the group consisting of alkylene and alkenylene radicals having from 1 to 18 carbon atoms, the reaction being effected through a bridging radical selected from the group consisting of

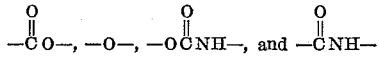

$$-\overset{O}{\underset{}{C}}O-, \quad -O-, \quad -O\overset{O}{\underset{}{C}}NH-, \text{ and } -\overset{O}{\underset{}{C}}NH-$$

the elemental fluorine content of said resin attributed to the $R_f$ radical being from 0.5 to about 20 weight percent of total resin.

6. The process of claim 5 wherein said reaction occurs concurrently with said polymerization.

7. The process of claim 5 wherein said reaction occurs subsequent to said polymerization.

(References on following page)

References Cited by the Examiner

UNITED STATES PATENTS

| | | | |
|---|---|---|---|
| 2,585,827 | 2/1952 | Padbury et al. | 260—22 |
| 2,803,615 | 8/1957 | Ahlbrecht et al. | 260—486 |
| 2,841,573 | 7/1958 | Ahlbrecht et al. | 260—482 |
| 2,863,848 | 12/1958 | Robitschek et al. | 260—22 |
| 2,951,051 | 8/1960 | Tiers | 260—23 X |
| 2,967,840 | 1/1961 | Phillips et al. | 260—22 |

LEON J. BERCOVITZ, *Primary Examiner.*

R. W. GRIFFIN, *Assistant Examiner.*